(12) United States Patent
da Silva et al.

(10) Patent No.: US 8,876,961 B2
(45) Date of Patent: Nov. 4, 2014

(54) PARTICLE SEPARATOR WITH DEFLECTOR AND LATERAL OPENING AND AIR FILTER SYSTEM

(75) Inventors: Carlos Alberto da Silva, Indaiatuba (BR); Rodrigo dos Santos Simo, Indaiatuba (BR)

(73) Assignee: Mann+Hummel GmbH, Ludwigsburg (DE)

( * ) Notice: Subject to any disclaimer, the term of this patent is extended or adjusted under 35 U.S.C. 154(b) by 283 days.

(21) Appl. No.: 13/401,337

(22) Filed: Feb. 21, 2012

(65) Prior Publication Data

US 2013/0213235 A1 Aug. 22, 2013

(51) Int. Cl.
*B01D 50/00* (2006.01)

(52) U.S. Cl.
USPC ............... 96/408; 55/337; 55/396; 55/397; 55/447; 55/453; 55/345; 55/459.1

(58) Field of Classification Search
CPC ....................................................... B01D 45/00
USPC ........ 55/320, 327, 434, 447, 459.1, 460, 462; 96/155, 188, 189, 408; 123/572
See application file for complete search history.

(56) References Cited

U.S. PATENT DOCUMENTS

| | | | |
|---|---|---|---|
| 3,853,518 A * | 12/1974 | Tu et al. | 55/337 |
| 3,920,426 A * | 11/1975 | Tu et al. | 55/337 |
| 3,925,044 A * | 12/1975 | Tu et al. | 55/337 |
| 4,246,013 A | 1/1981 | Truhan et al. | |
| 4,824,449 A | 4/1989 | Majoros | |
| 5,788,728 A | 8/1998 | Solis et al. | |
| 6,530,366 B2 * | 3/2003 | Geiger et al. | 123/568.11 |
| 6,589,323 B1 * | 7/2003 | Korin | 96/223 |
| 6,979,360 B1 | 12/2005 | Cetinkaya | |
| 7,662,199 B2 * | 2/2010 | Wellens et al. | 55/337 |
| 2007/0295315 A1 * | 12/2007 | Guerry et al. | 123/572 |

FOREIGN PATENT DOCUMENTS

| | | |
|---|---|---|
| DE | 2361995 A1 | 6/1975 |
| WO | 03030702 A2 | 4/2003 |

OTHER PUBLICATIONS

Search Report of the WIPO for PCT/EP2013/053362 dated Apr. 23, 2013.

* cited by examiner

*Primary Examiner* — Duane Smith
*Assistant Examiner* — Sonji Turner
(74) *Attorney, Agent, or Firm* — James Hasselbeck

(57) ABSTRACT

A particle separator and air filter system are provided and may include a housing having an inlet and an outlet. The housing may remove debris from air entering the housing at the inlet prior to expelling cleansed air at the outlet. A baffle may be disposed within the housing and may define a first path for directing cleansed air to the outlet and may cooperate with an inner surface of the housing to define a second path that causes the air to circulate within the second housing. The baffle may include an opening permitting communication between the first path and the second path.

24 Claims, 3 Drawing Sheets

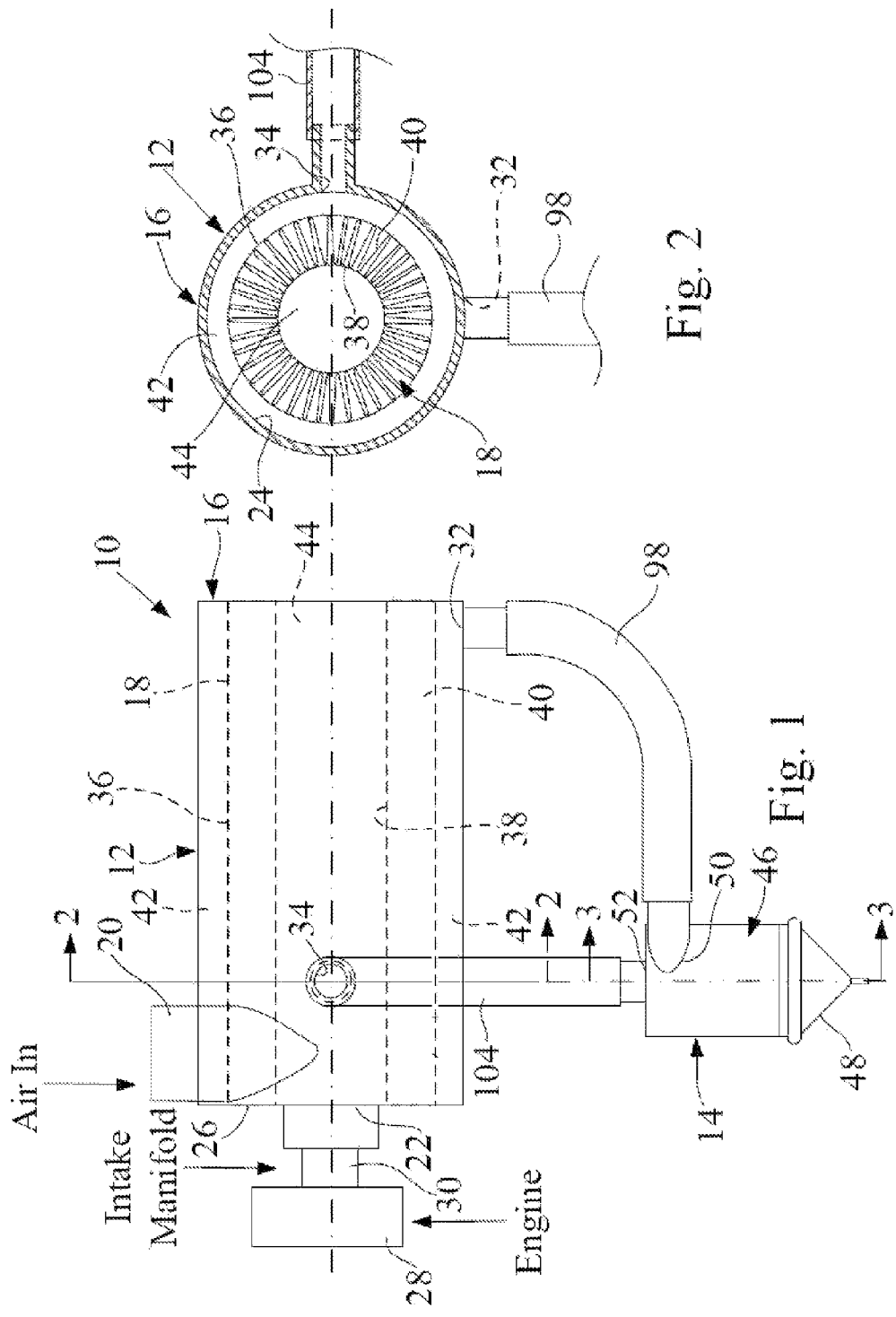

PARTICLE SEPARATOR WITH DEFLECTOR AND LATERAL OPENING AND AIR FILTER SYSTEM

FIELD

The present disclosure relates to particle separators and air filter systems having particle separators.

BACKGROUND

This section provides background information related to the present disclosure which is not necessarily prior art.

Air filters may be used in conjunction with an engine to provide the engine with a constant supply of clean air during use. For example, an air filter may be positioned upstream of an internal combustion engine in a vehicle to supply an intake manifold of the vehicle and, thus, the internal combustion engine, with clean air. The internal combustion engine utilizes the air supplied by the intake manifold and air filter and mixes the air with fuel during combustion. Providing the air filter upstream of the intake manifold and internal combustion engine improves the efficiency of and prevents damage to the engine by reducing the intake of solid particulate such as, for example, dust, dirt, and other debris into combustion chambers of the internal combustion engine.

Air filters typically include a filter media disposed within a housing that permits the passage of air therethrough between an inlet and an outlet. The filter media is typically configured to allow air to pass from the inlet to the outlet while concurrently removing solid particulate from the air flow. Once cleaned, the air is drawn from the housing and into the intake manifold for use by the engine during combustion while the solid particulate remains in the filter media and/or housing of the air filter.

Under normal operating conditions, a conventional air filter adequately removes solid particulate from incoming air prior to expelling cleansed air to the intake manifold and internal combustion engine. However, over time and/or when operating in dusty, sandy, or otherwise debris-laden environments, the filter media may become clogged with solid particulate, thereby reducing the effectiveness of the filter media in removing solid particulate from an air flow. Further, when the filter media becomes laden with solid particulate, air flow through the filter is reduced. As a result, the volume of clean air provided to the engine is insufficient, thereby reducing the efficiency of the engine. Only when the air filter is permitted to concurrently remove solid particulate from air entering the air filter and provide the engine with a sufficient volume of clean air does the engine operate efficiently.

SUMMARY

This section provides a general summary of the disclosure, and is not a comprehensive disclosure of its full scope or all of its features.

A particle separator is provided and may include a housing having an inlet and an outlet. The housing may remove debris from air entering the housing at the inlet prior to expelling cleansed air at the outlet. A baffle may be disposed within the housing and may define a first path for directing cleansed air to the outlet and may cooperate with an inner surface of the housing to define a second path that causes the air to circulate within the second housing. The baffle may include an opening permitting communication between the first path and the second path.

In another configuration, an air filter system having a particle separator is provided and may include a first housing having a filter media disposed therein. A second housing may be in fluid communication with the first housing and may remove debris from air received by the first housing. The second housing may include a baffle defining a first path for returning cleansed air to the first housing and may cooperate with an inner surface of the second housing to define a second path that causes the air to circulate within the second housing. The baffle may include an opening permitting communication between the first path and the second path.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an environmental view of an air filter system having a particle separator for use in conjunction with an intake manifold and engine;

FIG. 2 is a cross-sectional view of the air filter of FIG. 1 taken along line 2-2 of FIG. 1;

Corresponding reference numerals indicate corresponding parts throughout the several views of the drawings.

DETAILED DESCRIPTION

Figures 3, 4:
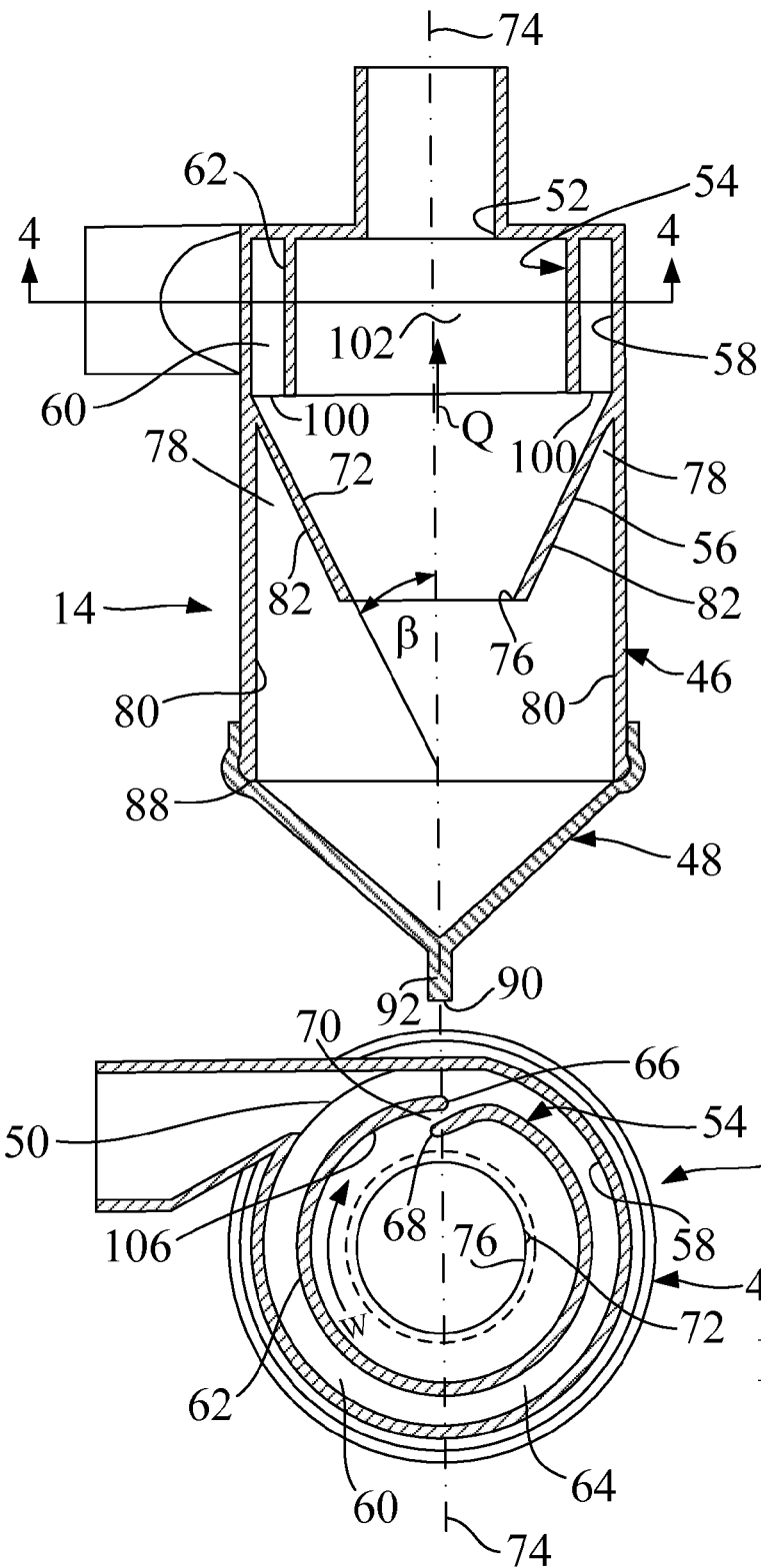
FIG. 3 is a cross-sectional view of a portion of the particle separator of FIG. 1 taken along line 3-3 of FIG. 1.
FIG. 4 is a cross-sectional view of a portion of the particle separator of FIG. 1 taken along line 4-4 of FIG. 3.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, an air filter system 10 or particle separation system is provided and may include a main-filter assembly 12 and a particle separator 14. The particle separator 14 is fluidly coupled to the main-filter assembly 12 and cooperates with the main-filter assembly 12 to remove solid particles from air received by the main-filter assembly 12.

The main-filter assembly 12 may include a housing 16 and a filter media 18. The housing 16 may include an air inlet 20 and a clean-air outlet 22. The air inlet 20 may be formed tangentially to an inner surface 24 (FIG. 2) of the housing 16 to induce a swirl to air entering the housing 16 at the air inlet 20. The clean-air outlet 22 may be formed at an end 26 of the housing 16 that is substantially perpendicular to the air inlet 20.

In one configuration, the clean-air outlet 22 is fluidly coupled to an engine 28 via an intake manifold 30. As will be described in greater detail below, fluidly coupling the clean-air outlet 22 to the engine 28—via the intake manifold 30—allows the air filter 10 to provide a supply of clean air to the engine 28 for use by the engine 28 during combustion.

The housing 16 may additionally include a separator outlet 32 and a separator inlet 34 that are fluidly coupled to the particle separator 14. Specifically, the separator outlet 32 is fluidly coupled to the particle separator 14 to supply the particle separator 14 with air while the separator inlet 34 is fluidly coupled to the particle separator 14 to receive cleansed air from the particle separator 14.

The filter media 18 may be centrally located within the housing 16 and may include an outer surface 36 and an inner surface 38 separated by a corrugated or pleated filter element 40. The outer surface 36 may cooperate with the inner surface 38 to provide the filter media 18 with a substantially cylindrical shape. The filter element 40 is disposed generally between the outer surface 36 and the inner surface 38 of the filter media 18 and may be formed from any suitable material that adequately separates solid particulate from air received at the air inlet 20 of the housing 16 while concurrently allowing air to pass through the filter element 40.

Once the filter media 18 is disposed within the housing 16, the filter media 18 defines a so-called "dirty" zone 42 and a so-called "clean" zone 44. The dirty zone 42 is in fluid communication with the air inlet 20 and receives ambient air from an area generally surrounding the air filter 10. The air received at the air inlet 20 is referred to as "dirty," as the ambient air likely contains solid particulate 45 (FIGS. 5 and 6) such as, for example, dust, dirt, and other debris. The area identified by reference number 44 is referred to as the "clean" zone, as air received at the air inlet 20 of the housing 16 first passes through the filter media 18 prior to entering the clean zone 44 and, therefore, is substantially free from solid particulate 45. In short, the air disposed within the dirty zone 42 may be laden with solid particulate 45 while the air disposed within the clean zone 44 is clean.

With particular reference to FIGS. 3-6, the particle separator 14 is shown as including a housing 46 and a discharge valve 48. The housing 46 may include a substantially cylindrical shape and, further, may include an inlet 50 and an outlet 52. The housing 46 may additionally include a baffle 54, as well as a cone-shaped extension 56.

The inlet 50 may be positioned relative to the housing 46 such that the inlet 50 is substantially tangential to an inner surface 58 of the housing 46. As such, air received at the inlet 50 engages the inner surface 58 of the housing 46, thereby causing the incoming air to swirl within the housing 46. The baffle 54 may be positioned relative to the inner surface 58 such that a gap 60 is provided between an outer surface 62 of the baffle 54 and the inner surface 58 of the housing 46. In one configuration, the baffle 54 includes a substantially circular shape that mimics the substantially circular cross-section of the housing 46 such that the outer surface 62 of the baffle 54 is substantially evenly spaced from the inner surface 58 of the housing 46. The baffle 54 may cooperate with the inner surface 58 to provide a first path 64 defined generally by the gap 60 that receives and directs air within the housing 46 when air is introduced into the housing 46 at the inlet 50.

While the baffle 54 is described as including a substantially circular shape and, further, as including a shape that substantially mimics the cylindrical shape of the housing 46, the baffle 54 may include a first end 66 and a second end 68, whereby the first end 66 is separated from the second end 68 to define an opening 70 extending through the baffle 54. In one configuration, the first end 66 is spaced apart and separated from the second end 68 to define a width of the opening 70 and, further, overlaps the second end 68 when viewed in cross-section (FIG. 4).

The cone-shaped extension 56 may include a surface 72 that is formed at an angle (β) relative to a longitudinal axis 74 of the housing 46. The surface 72 may extend from the inner surface 58 of the housing 46 to an opening 76 located at a distal end of the cone-shaped extension 56. The opening 76 may be aligned with the outlet 52 of the housing 46 such that the longitudinal axis 74 passes through the centers of the outlet 52 and the opening 76. Additionally, because the surface 72 is formed at an angle (β) relative to the longitudinal axis 74 of the housing 46, a pocket 78 may be formed between an inner surface 80 of the housing 46 located proximate to the discharge valve 48 and an outer surface 82 of the cone-shaped extension 56.

Figure 5:
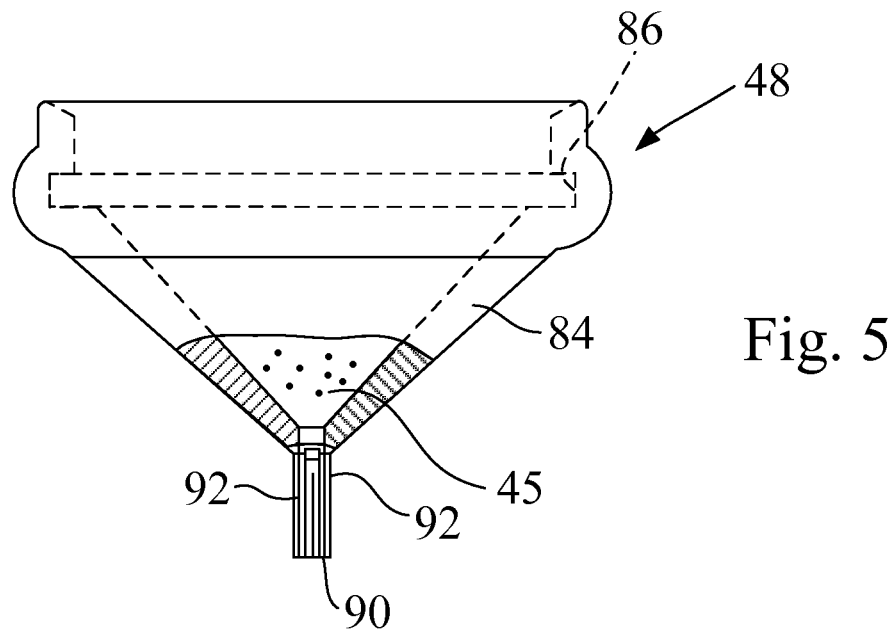
FIG. 5 is a partial cross-sectional view of a discharge valve of the particle separator of FIG. 1 shown in a closed state.
Figure 6:
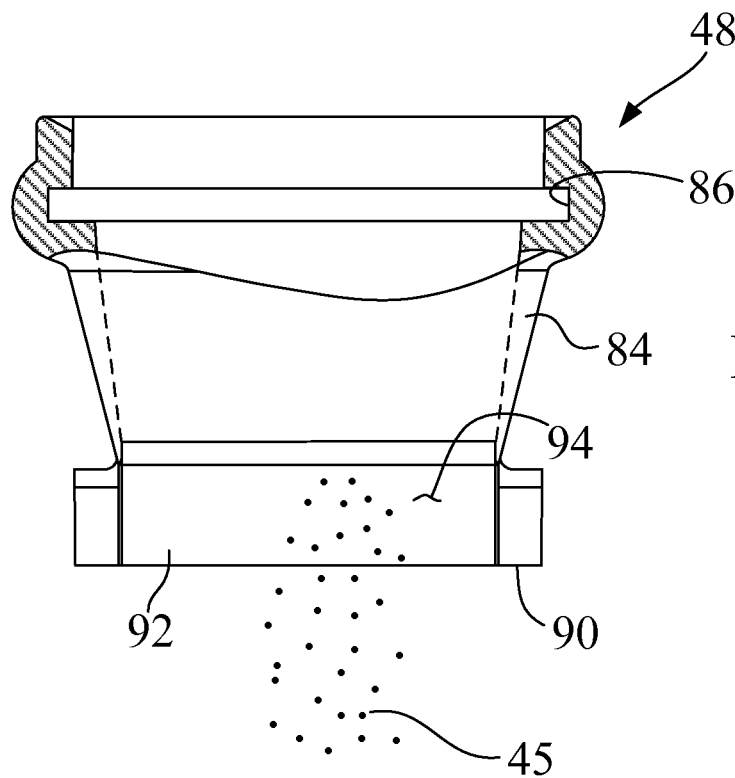
FIG. 6 is a partial cross-sectional lateral view of a discharge valve of the particle separator of FIG. 1 (shown rotated 90 degrees around a vertical axis relative to FIG. 5), shown in an open state.

With particular reference to FIGS. 5 and 6, the discharge valve 48 is shown to include a normally open valve member 84 movable between a closed state (FIG. 5) and an open state (FIG. 6). The valve member 84 may include a channel 86 shaped to receive a distal end 88 (FIG. 3) of the housing 46. In one configuration, the distal end 88 may include a localized thick spot or flange that is matingly received by the channel 86 of the valve member 84 to retain the valve member 84 in a desired position relative to the housing 46. Further, the channel 86 may be sized such that the valve member 84 must be slightly expanded in order to accommodate the distal end 88 of the housing 46 to increase the frictional engagement between the valve member 84 and the housing 46. The valve member 84 may be formed from an elastomeric material such as, for example, rubber. As such, the material of the valve member 84 may enhance the frictional engagement between the channel 86 of the valve member 84 and the distal end 88 of the housing 46 to further retain the valve member 84 on the housing 46.

The valve member 84 may include a distal end 90 having a pair of opposing walls 92 that are moved away from one another when the valve member 84 is in the open state to permit the passage of debris through the distal end 90 and between the walls 92. The walls 92 are shown in FIG. 5 as being in contact with one another and are shown as being partially separated from one another in FIG. 6, whereby the view shown in FIG. 6 is rotated approximately ninety degrees (90°) relative to the view shown in FIG. 5.

The walls 92 may be brought toward one another until at least a portion of the opposing walls 92 are in contact with one another to move the valve member 84 from the open state (FIG. 6) to the closed state (FIG. 5). In other words, the walls 92 may be moved toward one another until inner surfaces 94 (FIG. 6) of each wall 92 are in contact with one another. Once the inner surfaces 94 of the respective walls 92 are in contact with one another, the discharge valve 48 is in the closed state (FIG. 5) and passage through the distal end 90 of the valve member 84 is restricted.

The discharge valve 48 may be a normally open, fluidly actuated valve that responds to pressure changes within the housing 46. Therefore, when the housing 46 is at atmospheric pressure, the elastomeric material of the valve member 84 may cause the discharge valve 48 to be moved into the open state (FIG. 6) such that the walls 92 are moved away from one another and the inner surfaces 94 of the respective walls 92 are separated. Conversely, when the housing 46 is subjected to vacuum pressure, a force may be applied to the valve member 84, thereby causing the walls 92 to move toward one another until the discharge valve 48 is moved into the closed state (FIG. 5) and the inner surfaces 94 of the respective walls 92 are once again in contact with one another. In this position, solid particulate 45 may collect within the valve member 84 and is restricted from exiting the housing 46 at the distal end 90. However, when the vacuum applied to the housing 46 is released, the normally open valve member 84 is returned to the open state (FIG. 6), thereby allowing the solid particulate 45 disposed within the valve member 84 and housing 46 to be expelled from the discharge valve 48 and housing 46 via the distal end 90 of the valve member 84.

With particular reference to FIGS. 3-6, operation of the air filter system 10 will be described in detail. When the engine 28 is operating, a vacuum force is applied to the air filter system 10. Specifically, the engine 28 imparts a vacuum on the housing 16, thereby causing ambient air to be drawn into the housing 16 at the air inlet 20. The incoming air is received within the dirty zone 42 of the housing 16 and swirls generally within the housing 16. The air engages the filter media 18, which causes a portion of the air to pass through the filter media 18 from the dirty zone 42 to the clean zone 44. In so doing, solid particulate 45 disposed within the ambient air located within the dirty zone 42 is deposited into or on the filter media 18 prior to the air passing through the filter media 18 and reaching the clean zone 44. The air disposed within the clean zone 44 is likewise subjected to vacuum pressure caused by operation of the engine 28 and is expelled from the housing 16 via the clean-air outlet 22. The clean air exits the housing 16 at the clean-air outlet 22 and passes to the engine 28 via the intake manifold 30.

While a portion of the air drawn into the housing 16 at the air inlet 20 passes through the filter media 18 and moves from the dirty zone 42 to the clean zone 44, a portion of the incoming air at the air inlet 20 may first exit the housing 16 at the separator outlet 32. The air exiting the housing 16 at the separator outlet 32 may be laden with solid particulate 45 due to the ambient air entering the housing 16 at the air inlet 20 being laden with solid particulate 45. Additionally, because the filter media 18 separates solid particulate 45 from air passing through the filter media 18, solid particulate 45 trapped by the filter media 18 may be released by the filter media 18 and may ultimately collect proximate to a bottom portion of the housing 16 and near the separator outlet 32. Therefore, as air passes through the separator outlet 32, the air may collect the solid particulate 45 located within the bottom portion of the housing 16 and proximate to the separator outlet 32 and may carry the solid particulate 45 out of the housing 16 at the separator outlet 32.

A portion of the air disposed within the dirty zone 42 may be drawn into the separator outlet 32 due to the vacuum pressure exerted on the housing 16 at the clean-air outlet 22. Specifically, the separator outlet 32 may be at a higher pressure than the separator inlet 34 and, as a result, the air located within the dirty zone 42 may be drawn out of the housing 16 at the separator outlet 32, thereby causing the air to pass through the particle separator 14. In other words, the differential static pressure within the housing 16 causes air to be drawn out of the housing 16 at the separator outlet 32 such that the air is drawn through the particle separator 14 and ultimately is returned to the housing 16 at the separator inlet 34. This phenomenon is further enhanced by air swirling within the housing 16 passing over the separator inlet 34. Specifically, when the swirling air passes over the separator inlet 34, the air imparts a vacuum on the separator inlet 34, which further contributes to the pressure difference between the separator outlet 32 and the separator inlet 34.

The particulate-laden air drawn from the housing 16 flows through the particle separator 14 to allow the particle separator 14 to remove the particulate from the air prior to returning cleansed air to the housing 16 via the separator inlet 34. Removing the particulate from the housing 16 extends the lifespan of the filter media 18 by removing the particulate from the housing 16 before the particulate can occlude the filter media 18 and restrict flow therethrough.

The particulate-laden air drawn from the housing 16 at the separator outlet 32 may be communicated to the inlet 50 of the particle separator 14 via a conduit 98 (FIG. 1) that fluidly couples the separator outlet 32 of the housing 16 to the inlet 50 of the particle separator 14. The particle-laden air stream may be received by the housing 46 of the particle separator 14 at the inlet 50 and may be caused to swirl within the housing 46 due to the inlet 50 being positioned substantially tangent to the inner surface 58 of the housing 46.

The incoming air is caused to swirl generally within the first path 64 of the housing 46 due to the swirling motion imparted on the air when the air is first introduced into the housing 46 at the inlet 50. Because the incoming air is caused to swirl within the first path 64 and substantially around the longitudinal axis 74 of the housing 46, the heavier, solid particulate 45 located within the air stream is caused to move toward the inner surface 58 of the housing and generally away from the baffle 54. Once sufficient solid particulate 45 is disposed proximate to the inner surface 58 of the housing 46, the solid particulate 45 may pass from the first path 64 via an opening 100 and may be received by the surface 72 of the cone-shaped extension 56.

The solid particulate 45 received by the surface 72 of the cone-shaped extension 56 may travel along the surface 72 until the solid particulate 45 encounters the opening 76 of the cone-shaped extension 56. At this point, the solid particulate 45 passes through the opening 76 and encounters the discharge valve 48. If the discharge valve 48 is in the closed state (FIG. 5), the solid particulate 45 collects generally within the valve member 84 of the discharge valve 48. Alternatively, if the discharge valve 48 is in the open state (FIG. 6), the solid particulate 45 passes through the valve member 84 at the distal end 90 and is released to the atmosphere.

The discharge valve 48 will be in the closed state (FIG. 5) when the housing 46 is subjected to vacuum pressure caused by operation of the engine 28. Therefore, when the engine 28 is operating, the housing 46 of the particle separator 14 will be under vacuum pressure and the discharge valve 48 will be in the closed state. Alternatively, when the engine 28 ceases operation, the vacuum pressure imparted on the housing 46 of the particle separator 14 will be released, thereby allowing the valve member 84 to return to the open state to release the solid particulate 45 disposed within the discharge valve 48.

As the air entering the housing 46 swirls within the first path 64 and deposits solid particulate 45 on the surface 72 of the cone-shaped extension 56, the air may exit the first path 64 via the opening 100 and likewise may engage the cone-shaped extension 56. The cone-shaped extension 56 may cause the air to additionally swirl within the housing 46 due to the surface 72 of the cone-shaped extension 56 being formed at an angle ($\beta$) relative to the longitudinal axis 74 of the housing 46. The air swirling within the housing 46 may exit the housing via a second path 102 in a direction (Q). Specifically, the air swirling within the cone-shaped extension 56 of the housing 46 is under vacuum pressure due to operation of the engine 28. Therefore, the engine 28 may draw the air swirling within the cone-shaped extension 56 in the direction (Q) from the housing 46 via the outlet 52. The air may pass by the baffle 54 and may travel substantially along the longitudinal axis 74 in the direction (Q) until ultimately exiting the housing 46.

The air exiting the housing 46 at the outlet 52 may be received by a conduit 104 (FIG. 1), which may transport the clean air back to the housing 16 of the main-filter assembly 12. The air may be received by the housing 16 of the main-filter assembly 12 at the separator inlet 34 and may be received within the dirty zone 42. The air received within the dirty zone 42 will ultimately pass through the filter media 18 and reach the clean zone 44 prior to being drawn into the engine 28 via the clean-air outlet 22 and intake manifold 30.

As described, the air exiting the particle separator 14 at the outlet 52 is substantially free from solid particulate 45, as the solid particulate 45 has been removed due to the swirling motion imparted on the air entering the housing 46 by the tangential inlet 50 and the first path 64. However, should solid particulate 45 be disposed within the air swirling within the cone-shaped extension 56 of the housing 46, the solid particulate 45 will be drawn back into the first path 64 via the opening 70 of the baffle 54. Specifically, the second end 68 of the baffle 54 may extend into the second path 102 and may be positioned to receive air swirling in the direction (W; FIG. 4). Because the solid particulate 45 is heavier than the air and, further, because the air is swirling in the direction (W) within the cone-shaped extension 56, the solid particulate 45 will be forced against an inner surface 106 of the baffle 54. The solid particulate 45 collecting against the inner surface 106 of the baffle 54 may be directed through the opening 70 of the baffle 54 and, ultimately, may be received within the first path 64.

The solid particulate 45 re-entering the first path 64 via the opening 70 may mix with incoming air at the inlet 50, which will cause the solid particulate 45 to mix with solid particulate 45 entering the housing 46 at the inlet 50. As described, solid particulate 45 entering the housing 46 at the inlet 50 engages the inner surface 58 of the housing 46 and is ultimately expelled from the housing 46 via the opening 100 and discharge valve 48. Therefore, as air swirling within the cone-shaped extension 56 in the direction (W) exits the housing 46 along the second path 102 and in the direction (Q), any solid particulate 45 located within the air engages the inner surface 106 of the baffle 54 and is ultimately directed through the opening 70 by the second end 68 of the baffle 54 as the air flow exits the housing 46 along the second path 102. In short, the particle separator 14 removes most of the solid particulate 45 disposed within the air received at the inlet 50 and, further, removes any remaining solid particulate 45 disposed within the air as the air exits the particle separator 14 along the second path 102 due to the first path 64 being in communication with the second path 102.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A particle separator comprising:
a cylindrical housing elongated cylindrically surrounding a longitudinal axis, the housing including:
a cylindrical outer wall having a first axial end and an opposing second axial end;
the first axial end of the cylindrical housing closed over by a radial wall and having an outlet opening formed through the radial wall;
an annular outlet member formed on the radial wall surrounding the outlet opening, the outlet member extending axially outwardly from an exterior side of the radial wall;

an inlet opening formed in the cylindrical outer wall of the housing proximate to the first axial end of the cylindrical housing;

an annular inlet member formed on the radial exterior of the cylindrical outer wall of the housing surrounding the inlet opening, the inlet member extending outwardly from a radial exterior of the cylindrical outer wall of the housing;

wherein the particle separator is operable to remove debris from air entering said housing at said inlet member prior to expelling cleansed air at said outlet member; and a baffle substantially circular in shape and disposed within said housing, the baffle having a circumferential axially extending wall formed on an interior side of the radial wall surrounding the outlet opening and extending axially inwardly from the radial wall of the housing, the circumferential wall of the baffle extending circumferentially from a first circumferential end to a second circumferential end;

wherein the second circumferential end is spaced and bent radially inwardly away from the first circumferential end defining an baffle opening in the circumferential wall of the baffle between the first and second circumferential ends of the circumferential wall of the baffle;

wherein the baffle defines a first path for directing cleansed air to said outlet and cooperating with an inner surface of said cylindrical outer wall of said housing to define a second path that causes said air to circulate within, said baffle opening permitting communication between said first path and said second path through the circumferential wall of the baffle.

2. The particle separator of claim 1, wherein said inlet member is substantially tangent to said inner surface of said cylindrical outer wall of said housing.

3. The particle separator of claim 1, wherein said first path extends along a longitudinal axis of said housing, the first path is defined in a radial gap between the cylindrical outer wall of the housing and the baffle, the first path receiving air flow entering the particle separator at the inlet opening.

4. The particle separator of claim 3, wherein said second path surrounds said longitudinal axis.

5. The particle separator of claim 1, wherein said housing includes a conical surface arranged within an interior of the cylindrical outer wall of the housing, the conical surface having a first axial end secured onto the cylindrical outer wall of the housing, the conical surface tapering conically radially inwardly to an opposing second end of the conical surface, the conical surface defining a pocket cylindrical outer wall between the conical surface and the cylindrical outer wall of the housing;

wherein the conical surface is operable to receive debris from said second path.

6. The particle separator of claim 5, wherein said conical surface includes an opening at the second end of the conical surface, the conical surface opening aligned with said first path.

7. The particle separator of claim 1, further comprising an elastomeric discharge valve operable to selectively expel debris from said housing, the discharge valve arranged on and closing off the second axial end of the cylindrical outer wall of the housing.

8. The particle separator of claim 7, wherein said discharge valve is a normally open valve.

9. The particle separator of claim 7, wherein said discharge valve is a fluidly operated valve responsive to pressure changes within said housing.

10. The particle separator of claim 1, wherein said second circumferential end of said circumferential axially extending wall of said baffle overlaps said first circumferential end of said circumferential axially extending wall to define said baffle opening.

11. The particle separator of claim 1, wherein said baffle mimics a shape of said housing.

12. The particle separator of claim 1, wherein said baffle and said inner surface of said housing include a substantially circular shape.

13. An air filter system comprising:

a main-filter assembly including a filter housing, wherein the filter housing includes
  a separator inlet opening, opening into the filter housing at a dirty side of the filter media; and
  a separator outlet opening, opening into the filter housing at a clean side of the filter media;

a filter media disposed within said filter housing; and a particle separator arranged external to the filter housing, the particle separator including:
  a cylindrical housing elongated cylindrically surrounding a longitudinal axis the cylindrical housing including:
    a cylindrical outer wall having a first axial end and an opposing second axial end;
    the first axial end of the cylindrical housing closed over by a radial wall and having an outlet opening formed through the radial wall, the outlet opening fluidically connected to the separator inlet opening of the filter housing;
    an inlet opening formed in the cylindrical outer wall of the particle separator housing proximate to the first axial end of the cylindrical housing the inlet opening fluidically connected to the separator outlet of the filter housing;

wherein the particle separator is operable to remove debris from air entering said cylindrical housing at said inlet member prior to expelling cleansed air at said outlet member; and a baffle substantially circular in shape and disposed within said housing, the baffle having a circumferential axially extending wall formed on an interior side of the radial wall surrounding the outlet opening and extending axially inwardly from the radial wall of the housing, the circumferential wall of the baffle extending circumferentially from a first circumferential end to a second circumferential end;

wherein the second circumferential end is spaced and bent radially inwardly away from the first circumferential end defining an baffle opening in the circumferential wall of the baffle between the first and second circumferential ends of the circumferential wall of the baffle;

wherein the baffle defines a first path for directing cleansed air to said outlet and cooperating with an inner surface of said cylindrical outer wall of said housing to define a second path that causes said air to circulate within said second housing, said baffle opening permitting communication between said first path and said second path through the circumferential wall of the baffle;

wherein differential pressure in the filter housing between the dirty side and clean side of the filter media is operable to drawn air out of the filter housing at the separator outlet opening and through the particle separator, then returning to the filter housing at the separator inlet opening of the filter housing.

14. The air filter system of claim 13, wherein said inlet is substantially tangent to said inner surface of said cylindrical outer wall of said cylindrical housing.

15. The air filter system of claim 13, wherein said first path extends along a longitudinal axis of said cylindrical housing, the first path defined in a radial gap between the cylindrical outer wall of the cylindrical housing and the baffle, the first path receiving air flow entering the particle separator at the inlet opening.

16. The air filter system of claim 15, wherein said second path surrounds said longitudinal axis.

17. The air filter system of claim 13, wherein said cylindrical housing of said particle separator includes a conical surface arranged within an interior of the cylindrical outer wall of the cylindrical housing, the conical surface having a first axial end secured onto the cylindrical outer wall of the cylindrical housing, the conical surface tapering conically radially inwardly to an opposing second end of the conical surface, the conical surface defining a pocket between the conical surface and the cylindrical outer wall of the cylindrical housing; wherein the conical surface is operable to receive debris from said second path.

18. The air filter system of claim 17, wherein said conical surface includes an opening at the second end of the conical surface, the conical surface opening aligned with said first path.

19. The air filter system of claim 13, further comprising an elastomeric discharge valve operable to selectively expel debris from said cylindrical housing of the particle separator, the discharge valve arranged on and closing off the second axial end of the cylindrical outer wall of the cylindrical housing.

20. The air filter system of claim 19, wherein said discharge valve is a normally open valve.

21. The air filter system of claim 19, wherein said discharge valve is a fluidly operated valve responsive to pressure changes within said housing of said particle separator.

22. The air filter system of claim 13, wherein said second circumferential end of said circumferential axially extending wall of said baffle overlaps said first circumferential end of said circumferential axially extending wall to define said baffle opening.

23. The air filter system of claim 13, wherein said baffle mimics a shape of said cylindrical housing.

24. The air filter system of claim 13, wherein said baffle and said inner surface of said cylindrical housing include a substantially circular shape.

* * * * *